INVENTORS
WOLFGANG OPITZ
AND
KARL-HEINZ STEIGERWALD

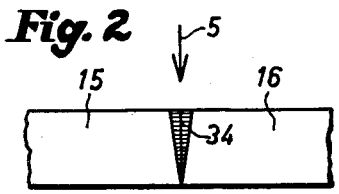
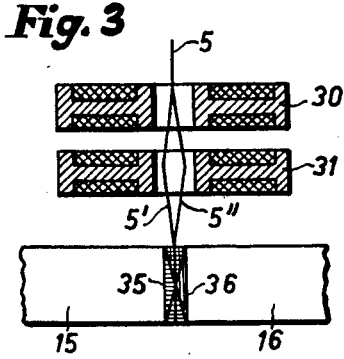
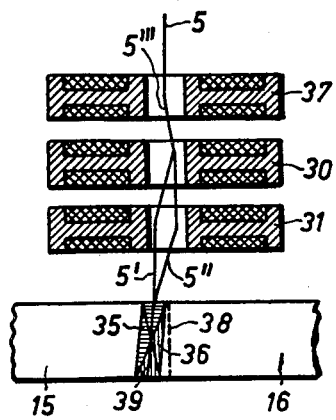
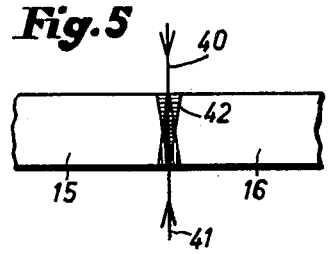
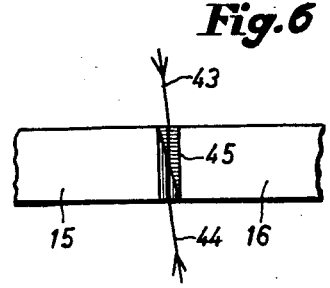
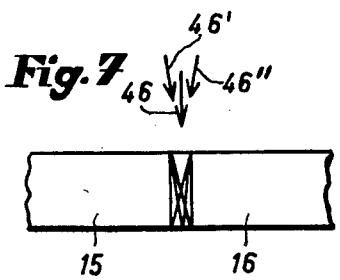
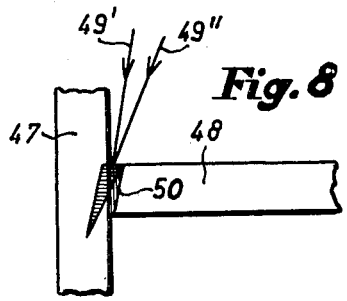
INVENTOR.
WOLFGANG OPITZ AND
KARL-HEINZ STEIGERWALD

United States Patent Office 3,134,013
Patented May 19, 1964

3,134,013
METHOD OF PRODUCING A WELD ZONE OF DESIRED CROSS-SECTIONAL SHAPE IN CHARGE-CARRIER-BEAM WELDING
Wolfgang Opitz, Aalen, Wurttemberg, and Karl-Heinz Steigerwald, Heidenheim, Germany, assignors, by mesne assignments, to United Aircraft Corporation, East Hartford, Conn., a corporation of Delaware
Filed Dec. 4, 1961, Ser. No. 156,770
Claims priority, application Germany Dec. 6, 1960
6 Claims. (Cl. 219—121)

This invention relates to welding and, more particularly, relates to an improved method and means for welding by an impinging beam of charged particles.

In the majority of welding processes customary heretofore, the heat energy is applied to the surface by a source, such as a torch. The heat energy is transmitted through the material by heat conduction. Since the conduction of heat is not directional, the weld zone produced by such welding methods is of semi-circular shape or, at best, V-shape with a very large included angle. As a result of this shape of the weld zone, considerable deformations in the angle between welded structures or internal stresses can occur upon the cooling of the workpieces.

Welding by means of a beam of charge carriers focused on the welding point is known to the art. As disclosed in U.S. Patent 2,987,610, if the energy density of the beam of charge carriers striking the workpieces to be welded is increased above a given limit value, for example 1 mw./cm.$^2$, the beam of charge carriers suddenly penetrates very deep into the workpiece and thereby effects a simultaneous melting of the entire material over the entire depth of penetration. In this welding process which has become known to the art under the name "deep welding," a melt zone of the shape of very acute V-shape is formed. The deformations of the workpiece or the stresses occurring within this zone of melted metal upon cooling are naturally considerably less than in the case of the other welding processes. Nevertheless, upon the cooling of such a V-shaped melt zone, a slight deformation of the workpiece can occur so that for instance in the butt-welding of edges of flat plates, their surfaces incline to each other at an obtuse angle. Such a non-uniform warping occurring over the depth of the entire weld seam is produced by the difference in the width of the V-shaped weld zone at different depths.

It is, therefore, an object of the present invention to provide an improved method and means for welding in which deformation of the workpiece is reduced.

It is a further object of the present invention to provide an improved method and means for welding in which the cross sectional shape of the weld zone is predetermined to alleviate distortion on cooling of the zone.

The present invention is based on the discovery that when welding with a beam of charge carriers, deformations of the workpiece can be avoided or that desired predetermined deformations can be obtained if the weld zone is imparted a predetermined cross-sectional shape. The present invention thus relates to a method of producing a weld zone of desired cross-sectional shape when welding by a beam of charge carriers which penetrates deep into the workpiece and melts it in a substantially V-shaped zone. The invention is characterized by the fact that at least one beam of charge carriers is directed against the welding point, and is tilted in such a manner around an axis parallel to the direction of the weld seam that the sides of the desired cross-sectional region are contacted by the sides of the V-shaped melt zone with simultaneous melting of the material in said cross-section.

If only one beam of charge carriers is employed, it is advantageously directed against the workpiece and periodically so tilted around an axis lying in the surface of the workpiece that the sides of the V-shaped zone melted by it coincide alternately, one after the other, with the sides of the desired cross-sectional region. If a plurality of beams of charge carriers directed against the workpiece are used for the welding, at least some of these beams are so tilted that the sides of the desired cross-sectional region are contacted, one after the other, or simultaneously, by the sides of the V-shaped melting zone.

The tilting of the beam or beams of charge carriers is effected in this connection with such a high frequency that the movement of the beam at right angles to the direction of welding is large, as compared with the relative movement in the direction of welding. In this connection, it is advantageous so to control the tilting of the beam of charge carriers that the times of dwell of the beam in the different cross-sectional regions of the welding zone are different. Such control of beam tilt is preferably achieved by energizing the deflection elements with deflection voltages or deflection currents which are non-linear as a function of time. By this control of the beam deflection, the energy distribution in the weld can be matched to that required. For example, more energy may be fed to the marginal regions of the melt zone, which is cooled by the heat conduction to the adjacent material, than to the regions of material located in the center of the weld zone.

If an intermittent or pulsed beam of charge carriers is used for welding, it is advantageous to deflect the beam during the pauses between the impulses. Furthermore, it is advisable in this case also to make the movement of the beam in the direction of welding intermittent, this movement becoming zero during the transverse deflection of the beam of charge carriers.

In all the types of beam tilting described above, the result is obtained that finally the entire cross-section of the weld zone is melted. The entire desired cross-sectional region is therefore filled with molten material during the welding process.

This effect can be obtained in the new method for producing a weld zone of desired cross-sectional shape when welding by means of a beam of charge carriers which penetrates deep into the workpiece and melts a substantially V-shaped zone, in accordance with a further development of the inventive concept, in the manner that a plurality of beams of charge carriers are so directed against the workpiece that the melt zones produced by them completely fill up the desired cross-section. For this purpose, it may be necessary and advantageous, in the case of certain cross-sectional shapes to direct the beams of charge carriers against the workpiece from different sides.

The present invention is used to particular advantage for the production of weld zones of rectangular cross-section. Upon the cooling of the melted material within such a weld zone, only a slight contraction of the workpieces in the plane at right angles to the weld seam can occur, caused by the shrinkage of the material.

If a rectangular cross-sectional shape is to be produced by means of only one beam of charge-carriers, this beam is tilted during the welding process in such a manner about an axis lying in the surface of the workpiece that an acute angle is described in the plane at right angles to the direction of welding between the end positions of its deflection in the workpiece, this angle being equal to the angle of the melt zone when the beam is not deflected.

It is also possible to obtain a rectangular weld zone by using two beams of charge carriers directed from different sides onto the workpiece. These two beams are parallel to each other, and inclined in such a manner with respect to the surface of the workpiece that the outer sides of their melt zones are at right angles to the surface of the workpiece. If the beam of charge carriers, in addition to its tilting, is simultaneously deflected at right angles to the direction of welding, then a rectangular weld zone of relatively large width can be produced. Additionally the weld zone can be displaced to one side to compensate for a lateral deflection of the weld seam path with respect to the beam.

The apparatus for carrying out the method in accordance with the invention consists of a device known per se for generation of a beam of charge carriers of sufficient beam intensity to give deep welding. Two deflection systems are arranged in different planes along the axis of the beam. By this construction of the device, the result can be obtained that the deflection elements can be arranged at sufficient distance from the workpiece. The first deflection system, as seen in the direction of the beam, deflects the beam of charge carriers out of its original direction, while the second deflection system deflects it in opposite direction in such a manner that it intersects its original direction at the height of the surface of the workpiece. If the two deflections are effected synchronously, the result can be obtained that the beam of charge carriers always intersects its original direction at the height of the surface of the workpiece, and therefore that it is tilted around an axis lying in seam direction in the surface of the workpiece. In this way the deflected beam moves over the desired angular region in the workpiece.

If this angular region is very small, it is also possible in principle to use only a single deflection system. As soon as the angular region to be passed over by the beam is somewhat larger, however, this system must be arranged very close above the workpiece in order to produce a weld seam which is not too spread out at right angles to the direction of welding.

Having briefly described the invention, it will be described in detail, along with further objects and advantages thereof, in the following detailed description which may best be understood by reference to the accompanying drawings, of which:

FIG. 2 is a sectioned view of a weld zone in accordance with the prior art;

FIG. 3 is a sectioned view, on a larger scale, of a portion of the apparatus shown in FIG. 1 and a weld zone produced in accordance with the present invention;

FIG. 4 is a sectioned view of another embodiment of the apparatus shown in FIG. 3;

FIG. 5 is a sectioned view of a weld zone produced by having two beams of charge carriers impinging from different sides;

FIG. 6 is a sectioned view of a weld zone produced by two beams of charge carriers impinging from different sides;

FIG. 7 is a workpiece and the deflection steps occurring when using an intermittently controlled welding beam;

FIG. 8 is a sectioned view of a weld zone extending obliquely to the abutting surface between two workpieces which are to be welded together.

Figure 1:
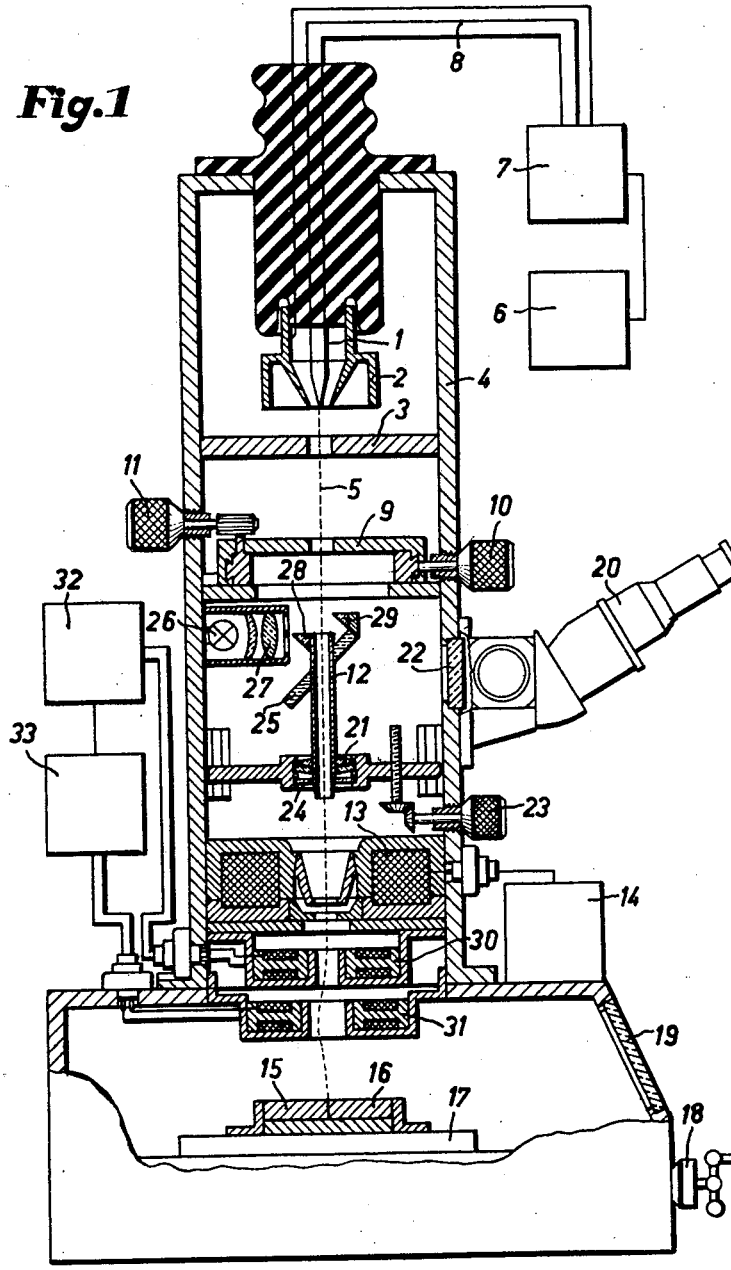
FIG. 1 is a partial section through an apparatus constructed in accordance with the present invention.

In FIG. 1, there is shown an electron beam generator comprising a cathode 1, control electrode 2 and anode 3. This generator is housed in a grounded metallic housing 4, and produces an electron beam 5. In the apparatus 6, a high voltage of, for example 100 kv., is produced and fed by a high voltage cable provided with a grounded jacket to the apparatus 7. This apparatus serves to produce the adjustable heating voltage and the adjustable control-electrode bias voltage. These voltages are fed to the beam generating system via the three-wire high voltage cable 8 provided with a grounded jacket.

Seen in the direction of the beam, there is arranged below the anode 3 a diaphragm 9 which can be moved in the plane of the paper and perpendicular thereto by means of the knobs 10 and 11.

Below the diaphragm 9, there is provided a grounded tube 12 through which the beam 5 passes. An electromagnetic lens 13, the current supply unit of which is designated 14, serves to focus the electron beam 5 on the workpieces 15 and 16 which are to be welded together. These workpieces are supported on a compound table, known per se, and can be moved by a spindle 18 in the direction of the weld seam. For the displacement of the workpiece at right angles to the direction of the weld seam, there is provided another spindle, not shown in the drawing. The welding process can be observed through the window 19.

For more accurate observation of the welding process, there is provided a microscope 20 which is connected with the housing 4, and the objective lens 21 of which is separated from the microscope housing proper and arranged in the housing 4. Between the objective 21 and the microscope 20, there is ararnged an X-ray-protective glass 22 which keeps injurious radiation away from the microscope 20. The microscope objective 21 can be moved for focusing by a knob 23 in the direction of its optical axis. In order to protect the objective 21 from impinging material vaporized from the workpiece, a protective glass 24 is provided in front of it.

During welding, the material on which the beam impinges becomes heated to incandescence. The light proceeding from the flowing weld is focused into parallel rays by means of the microscope objective 21, reflected by the mirror 25 arranged on the bored tube 12 into the microscope 20 and from there imaged in the customary manner by the microscope optics.

In order that an adjustment of the workpieces 15 and 16 can also be effected before the introduction of the welding process, there is provided a source of light 26 which, via a condenser lens 27 and two prisms 28 and 29 illuminates the workpieces 15 and 16 through the partially transmitting mirror 25.

Seen in the direction of the beam, two electromagnetic deflection systems 30 and 31 are arranged below the electromagnetic lens 13. Each of these systems consists, for example, of four deflection coils, each arranged at right angles to another. In order to produce the deflection current for the deflection system 30, there is provided a generator 32, while a generator 33 serves to produce the deflection current for the deflection system 31.

It is also possible to use one electrostatic and one electromagnetic deflection system rather than two electromagnetic deflection systems. This has the advantage that the two deflection systems can be brought closer together since the fields do not interfere with each other. In particular, it also becomes possible to arranged the electrostatic deflection system very close to the lens 13. If the generators 32 and 33 are disconnected, the electron beam 5 impinges perpendicularly on the surface of the workpieces 15 and 16, and penetrates into the two workpieces over the entire depth of the joint between them to produce a deep V-shaped weld shown in FIG. 2. As illustrated in FIG. 2 and explained in U.S. Patent 2,987,610 upon the penetration of the electron beam 5 into the workpieces 15 and 16, there is produced a weld zone 34 of a very acute V-shape. Upon a cooling of the material which has melted within this zone, shrinkage which is non-uniform over the depth of the seam is produced as a result of the difference in width of the weld zone at different depths. Therefore the surfaces of the workpieces 15 and 16 which are developed as plates can incline to each other at an obtuse angle upon cooling.

In order to avoid this disturbing effect, the deflection system 30 is fed a current which produces a periodic deflection of the electron beam 5 out of its rest position. These conditions can be clearly noted from the enlarged showing in FIG. 3. The deflecting system 31 is fed in opposite phase such a deflecting current that the electron beam 5 is so deflected in opposite direction that it intersects its original direction at the height of the surface of the workpiece. The two extreme deflection positions of the electron beam 5 are designated 5' and 5" in FIG. 3.

The penetrating beam produces a V-shaped weld zone. When the beam 5' impinges the workpieces 15 and 16, the weld zone 36 is produced. Regulation of the angle of incidence of the beam will cause the side of the zone 36 to be perpendicular to the surface of the workpiece. Similarly the beam, when deflected to 5", produces a weld zone 35, the side of which is perpendicular to the surface of the workpiece. Thus as the beam is deflected between extremes 5' and 5", there is produced a rectangular weld zone the edges of which are perpendicular to the workpiece surface.

As can readily be understood, the angle between the deflection position 5' and 5" corresponds to the angle of the V-shaped melt zone 34. The two deflection generators 32 and 33 are coupled together so that the deflection systems 30 and 31 are at all times fed such currents that the electron beam 5 is tilted about the axis extending in the direction of the weld seam and lying in the surface of the workpiece.

In order to obtain the desired energy distribution within the resultant rectangular weld zone, a suitable time function is imparted to the periodic deflection currents for the deflection systems 30 and 31. In particular, it is advantageous to develop the generators 32 and 33 in such a manner that they supply deflection currents of a non-linear variation with time. For instance, the generators 32 and 33 supply deflection currents of square, sinusoidal or trapezoidal wave form. In this way, the time of dwell of the electron beam 5 and thus the amount of heat given off in the various directions of its deflection angle is controlled in desired manner. For example when using a rectangular or sinusoidal deflection current waveform, the electron beam 5 dwells longer in the end positions 5' and 5" than in the central positions, and, more energy is fed to the zones 35 and 36 than to the melt zones located between these two zones. In this way, the heat loss at the edges of the melt zone by conduction to the workpieces 15 and 16 is compensated.

FIG. 4 shows an apparatus in which, in addition to the deflection systems 30 and 31 another deflection system 37 is provided. This deflection system deflects the beam 5 out of its original direction in such a manner that it enters the deflection system 30 in the direction 5'''. For this reason, the electron beam 5 is shifted toward the left, i.e., the weld zone travels to the left in the workpiece. In this way, deviations of the abutting edge between the workpieces 15 and 16 from a straight line, represented by 38 to the position represented by 39 can be tracked. The deflection system 37 therefore affords the possibility of compensating for lateral deviations of the weld point with respect to the beam.

The same effect could also be obtained without the deflection system 37. In this case, a direct current of a given magnitude would have to be super imposed on the deflection current for the deflection system 30.

If an additional periodic deflection current is superimposed on the deflection current for the deflection system 30, or if a periodic deflection current is fed to the deflection system 37 shown in FIG. 4, rectangular melt zones can be produced of a width which is substantially greater than the width of the melt zone shown in FIG. 3.

In the showing of FIG. 5, two beams of charge carriers 40 and 41 impinge from different sides onto the workpieces 15 and 16. There is thus produced a melt zone 42 which is somewhat constricted in the center. This constriction, however, is unimportant in producing distortion since the resultant seam is symmetrical and can, in most cases, be readily tolerated.

In FIG. 6, two beams of charge carriers 43 and 44 impinge from different sides on the workpieces 15 and 16. Both beams of charge carriers are so inclined with respect to the surface of the workpieces as to produce a rectangular weld zone 45, the edges of which are at right angles to the surface of the workpieces.

FIG. 7 shows the two workpieces 15 and 16 upon which there impinges a pulsed beam of charge carriers 46. This beam of charge carriers is so tilted around the axis located in the surface of the workpieces that it assumes successively the positions 46', 46, 46". The tilting of the beam of charge carriers takes place in this connection during the pauses between the pulses. In the case shown here, the movement of the workpieces 15 and 16, in the direction of the weld seam is effected intermittently. The workpieces remain stationary until the beam of charge carriers has successively assumed the three deflection positions shown in the drawing. Then the workpieces are moved an incremental distance. The incremental distance is maintained sufficiently small so that the successive impingement of the beam of charge carriers 46 overlaps the melt zone produced in the preceding welding step.

The same effect can also be obtained by moving the compound table 17 on which the workpieces 15 and 16 are supported continuously in the direction of the seam, in which connection, however, it is seen to it by a deflection of the beam of charge carriers 46 opposite the direction of the weld seam that no relative motion takes place between the beam and workpiece as long as the beam of charge carriers is tilted. When this tilting has been completed, the beam of charge carriers is deflected in the direction of the weld seam until it has reached the next point of impingement. In order to obtain such a longitudinal deflection of the beam of charge carriers, another sawtooth deflection current can be superimposed for instance by the deflection current flowing through the deflection system 31.

FIG. 8 shows two workpieces 47 and 48, which are to be welded together. If these two workpieces are supported in this connection as shown in FIG. 8 on the compound table 17, the weld beam in non-deflected condition cannot reach the welding point. For this reason the beam of charge carriers 49 is deflected from its original direction and now strikes obliquely to the joint against the workpieces 47 and 48. In addition, the beam of charge carriers is tilted around an axis lying in the workpiece surface, in which connection it assumes successively the two deflection positions 49' and 49". In this way, there is produced a linearly defined weld zone 50, which is inclined in the direction of its depth with respect to the original beam direction.

In all the examples shown and described here, the tilting of the beam of charge carriers must take place so rapidly that the beam moves considerably faster at right angles to the welding direction than in the direction of the weld seam.

The apparatus shown in FIG. 1 is used not only to produce the cross-sectional shapes of weld zones shown in FIGS. 3 to 8, but with its aid, any desired cross-sectional shapes of the weld zone can be produced. For this purpose, it is merely necessary to change the deflection angle of the beam of charge carriers accordingly or to provide a plurality of beams of charge carriers impinging in suitable directions on the workpiece.

This invention may be variously modified and embodied within the scope of the subjoined claims.

What is claimed is:

1. The method of producing a weld zone of desired cross sectional shape when welding with a beam of charge carriers, the intensity of which is sufficiently high to cause beam penetration deeply into the material and to melt a substantially V-shaped zone, comprising focusing a beam of charge carriers on the weld zone, and periodically tilting the beam about an axis lying on the surface of the material and extending in the direction of the weld seam so that the zone melted by the beam sweeps from a first position coinciding with one edge of said desired zone to a second position coinciding with the other edge of said desired zone, said one edge and said other edge being substantially parallel, said beam sweep taking place with substantially no relative beam movement in the direction of the weld seam.

2. The method of welding in accordance with claim 1 in which the beam of charge carriers is a pulsed beam and in which the beam of charge carriers is tilted during the pauses between the pulses.

3. The method of welding in accordance with claim 1 in which the desired cross sectional shape of weld zone is a rectangle.

4. The method of welding in accordance with claim 1 which includes deflecting the beam at right angles to the weld direction simultaneously with tilting of the beam.

5. The method in accordance with claim 1 in which the work is moved relative to the beam and in which said periodic tilting of the beam is at a high frequency so that the rate of movement of the beam transverse to the seam is high with respect to movement in the direction of the weld seam.

6. The method of welding in accordance with claim 1 in which the beam of charge carriers is so tilted that its dwell time and thus the amount of heat given off in the positions of the tilting in which the beam coincides with said one and other edge of said desired zone is greater than in the other tilting positions.

References Cited in the file of this patent
UNITED STATES PATENTS

| | | |
|---|---|---|
| 2,899,556 | Schopper et al. | Aug. 11, 1959 |
| 2,987,610 | Steigerwald | June 6, 1961 |
| 3,020,387 | Basche et al. | Feb. 6, 1962 |
| 3,033,974 | Schleich et al. | May 8, 1962 |